US005874950A

United States Patent [19]

Broussard et al.

[11] Patent Number: 5,874,950

[45] Date of Patent: Feb. 23, 1999

[54] METHOD AND SYSTEM FOR GRAPHICALLY DISPLAYING AUDIO DATA ON A MONITOR WITHIN A COMPUTER SYSTEM

[75] Inventors: Scott Joseph Broussard, Boca Raton; Lori Metivier Ruffing, Deerfield Beach, both of Fla.

[73] Assignee: International Business Machines Corporation, Armonk, N.Y.

[21] Appl. No.: 575,435

[22] Filed: Dec. 20, 1995

[51] Int. Cl.[6] .................................................... G06T 11/30

[52] U.S. Cl. ............................................ 345/302; 345/440

[58] Field of Search .................................... 395/140, 806, 395/807; 345/440, 302

[56] References Cited

U.S. PATENT DOCUMENTS

| | | | |
|---|---|---|---|
| 4,713,771 | 12/1987 | Crop | 364/487 |
| 5,039,937 | 8/1991 | Mandt et al. | 324/121 R |
| 5,054,360 | 10/1991 | Lisle et al. | 84/645 |
| 5,079,720 | 1/1992 | Sinclair | 395/143 |
| 5,204,969 | 4/1993 | Capps et al. | 395/961 |
| 5,331,111 | 7/1994 | O'Connell | 84/602 |
| 5,371,842 | 12/1994 | Easton et al. | 395/140 |
| 5,412,579 | 5/1995 | Meadows et al. | 395/135 |
| 5,420,516 | 5/1995 | Cabot | 324/620 |
| 5,440,756 | 8/1995 | Larson | 395/800 |
| 5,528,356 | 6/1996 | Harcourt | 356/73.1 |
| 5,574,843 | 11/1996 | Gerlach, Jr. | 395/118 |
| 5,586,216 | 12/1996 | Degen et al. | 395/2.85 |

FOREIGN PATENT DOCUMENTS

| | | |
|---|---|---|
| 59-189764 | 10/1984 | Japan . |
| 60-7259 | 1/1985 | Japan . |

OTHER PUBLICATIONS

IBM Technical Disclosure Bulletin, vol. 31, No. 9, Feb. 1989, "Method of Automatic Audio Marking and Insertion of Canned Audio for Basic Audio Editor".

*Primary Examiner*—Rudolph J. Buchel, Jr.
*Attorney, Agent, or Firm*—Mark S. Walker; Antony P. Ng; Andrew J. Dillon

[57] ABSTRACT

A method for graphically displaying audio data within a computer system is disclosed. A frame size is first selected for an audio data file and the audio data file is divided into a multiple number of frames. Except for the last frame, each frame contains a substantially equal number of audio data samples. Then a multiple of variables is initialized. For each frame, a first data value, a high data value, a low data value, and a last data value are selected. Each of these four data values is stored in the appropriate variable. The data selection process continues until the last frame of the data file is reached. Finally, a line connecting all the selected data value points for each frame is displayed on a graphic display.

12 Claims, 9 Drawing Sheets

METHOD AND SYSTEM FOR GRAPHICALLY DISPLAYING AUDIO DATA ON A MONITOR WITHIN A COMPUTER SYSTEM

BACKGROUND OF THE INVENTION

1. Technical Field

The present invention relates to a method and system for data processing in general, and in particular to a method for displaying graphics within a computer system. Still more particularly, the present invention relates to a method for graphically displaying audio data in a computer system.

2. Description of the Prior Art

Multimedia software allows a simultaneous presentation of sight and sound on a computer system, such that the presentation can be made in a more comprehensive manner than it could ever be with either sight or sound individually. Typically, multimedia software also provides a user the capability to edit graphical images and sound tracks so that they will both appear in a synchronized fashion as the user desired. With the increasing display resolution of graphic monitors and video adapter cards, graphical images can be displayed with satisfying results. However, this is not the case for audio data. For a sampling rate of 10 KHz, one second of speech would comprise 10,000 samples; whereas, a typical graphic monitor can only display, with present technology, about 1000 pixels in either x or y directions. Therefore, when displaying a significant amount of speech data, many consecutive waveform samples are displayed at the same pixel position on the graphic monitor. Such over-plotting is not only a waste of computer time and effort, it may not even yield a true representation of the audio data trend.

There are numerous attempts intending to resolve this problem. However, these prior art algorithms, such as byte averaging and high/low/middle methodology, also do not yield a true representation of the audio data because these algorithms tend to obscure the trends in the audio data. Because the visual representation relies on the transition from silence to noise and vice versa to form its peaks and valleys, it is imperative to have the audio data displayed in a manner that best represents these transitions.

Consequently, it would be desirable to provide an improved method for graphically displaying audio data in a computer system.

SUMMARY OF THE INVENTION

In view of the foregoing, it is therefore an object of the present invention to provide an improved method and system for data processing.

It is another object of the present invention to provide an improved method and system for displaying graphics within a computer system.

It is yet another object of the present invention to provide an improved method and system for graphically displaying audio data within a computer system.

In accordance with the method and system of the present invention, an audio data file or any waveform file is first divided into multiple frames, wherein each frame contains a substantially equal number of audio data samples. Thereafter, a multiple of variables are initialized, including: a first data value, a high data value, a low data value, and a last data value for each frame are selected. Each of these four data values is then stored in an appropriate variable. The data selection process continues until the last frame of the data file is reached. Finally, a line connecting all of the selected data points for each frame is displayed on a graphic display.

All objects, features and advantages of the present invention will become apparent in the following detailed written description.

DESCRIPTION OF THE DRAWINGS

The invention itself as well as a preferred mode of use, further objects and advantage thereof, will best be understood by reference to the following detailed description of an illustrative embodiment when read in conjunction with the accompanying drawings, wherein.

DETAILED DESCRIPTION OF PREFERRED EMBODIMENT

The present invention may be implemented on a variety of computers under a number of different operating systems. The computer may be, for example, a personal computer, a mini-computer or a main-frame computer. The computer may be a stand-alone system or part of a network such as a local area network (LAN) or a wide area network (WAN). For the purpose of illustration, a preferred embodiment of the present invention as described below is implemented on a personal computer, such as the Aptiva™ series manufactured by International Business Machines Corp., under the operating system OS/2 Warp™ which is also manufactured by International Business Machines Corp. As a preferred embodiment, the audio data in the present invention is displayed under a Graphical Programming Interface (GPI) of OS/2 Warp™, which may be accelerated by additional hardware.

Figure 1A:
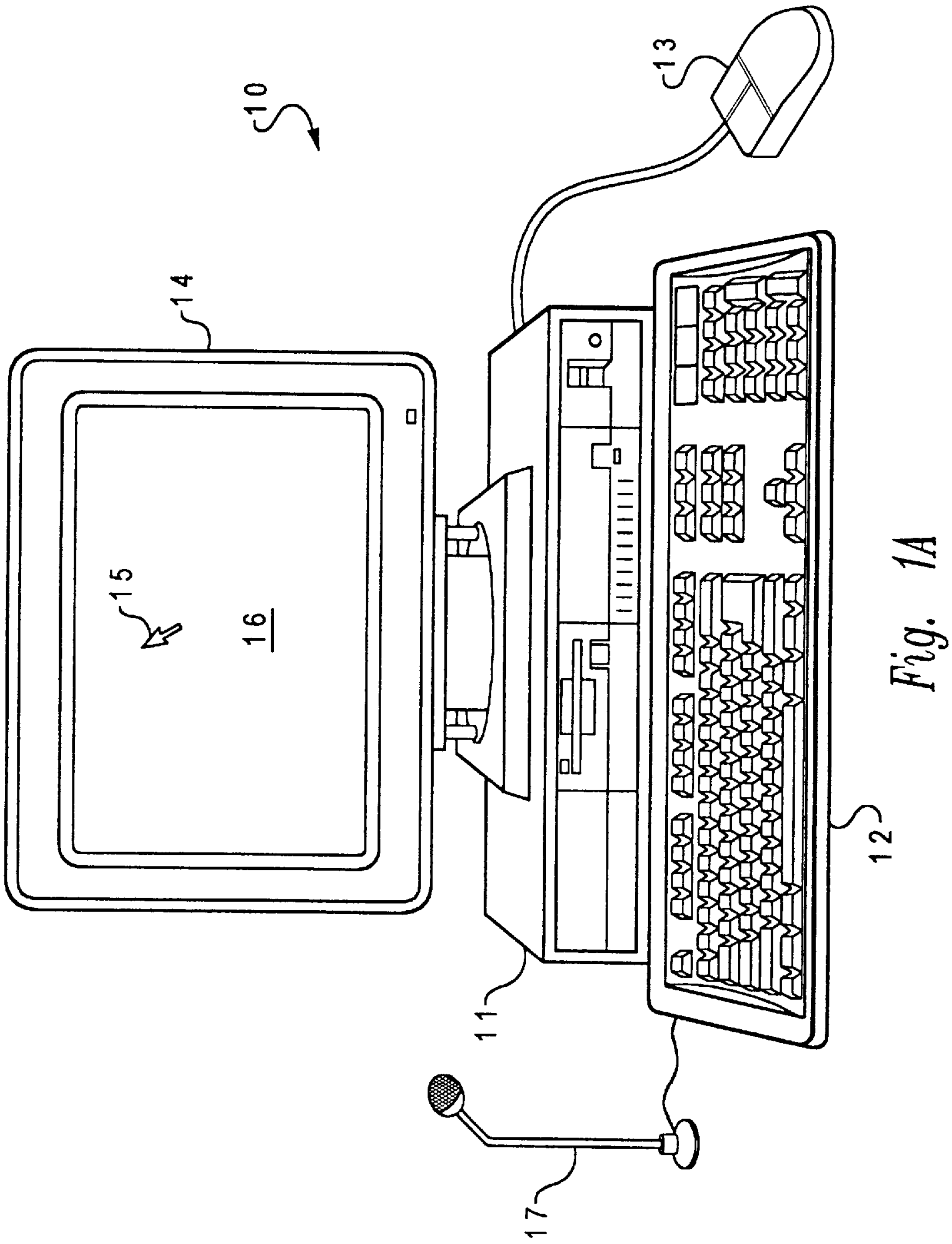
FIG. 1A is a pictorial diagram of a personal computer utilized by a preferred embodiment of the present invention.

Referring now to the drawings and in particular to FIG. 1A, there is depicted a diagram of a personal computer 10 which may be utilized by a preferred embodiment of the present invention. Personal computer 10 comprises processor unit 11, keyboard 12, mouse 13, microphone 17 and graphic display (or monitor) 14. Keyboard 12, mouse 13 and microphone 17 constitute user input devices, and graphic display 14 constitutes an output device. Mouse 13 is utilized to control cursor 15 displayed on screen 16 of graphic display 14, while microphone 17 is utilized to receive audio inputs. Personal computer 10 supports a Graphic User Interface (GUI) which allows a user to "point-and-shoot" by moving cursor 15 to an icon or specific location on screen 16 via mouse 13 and then press one of the buttons on mouse 13 to perform a user command.

Figure 1B:
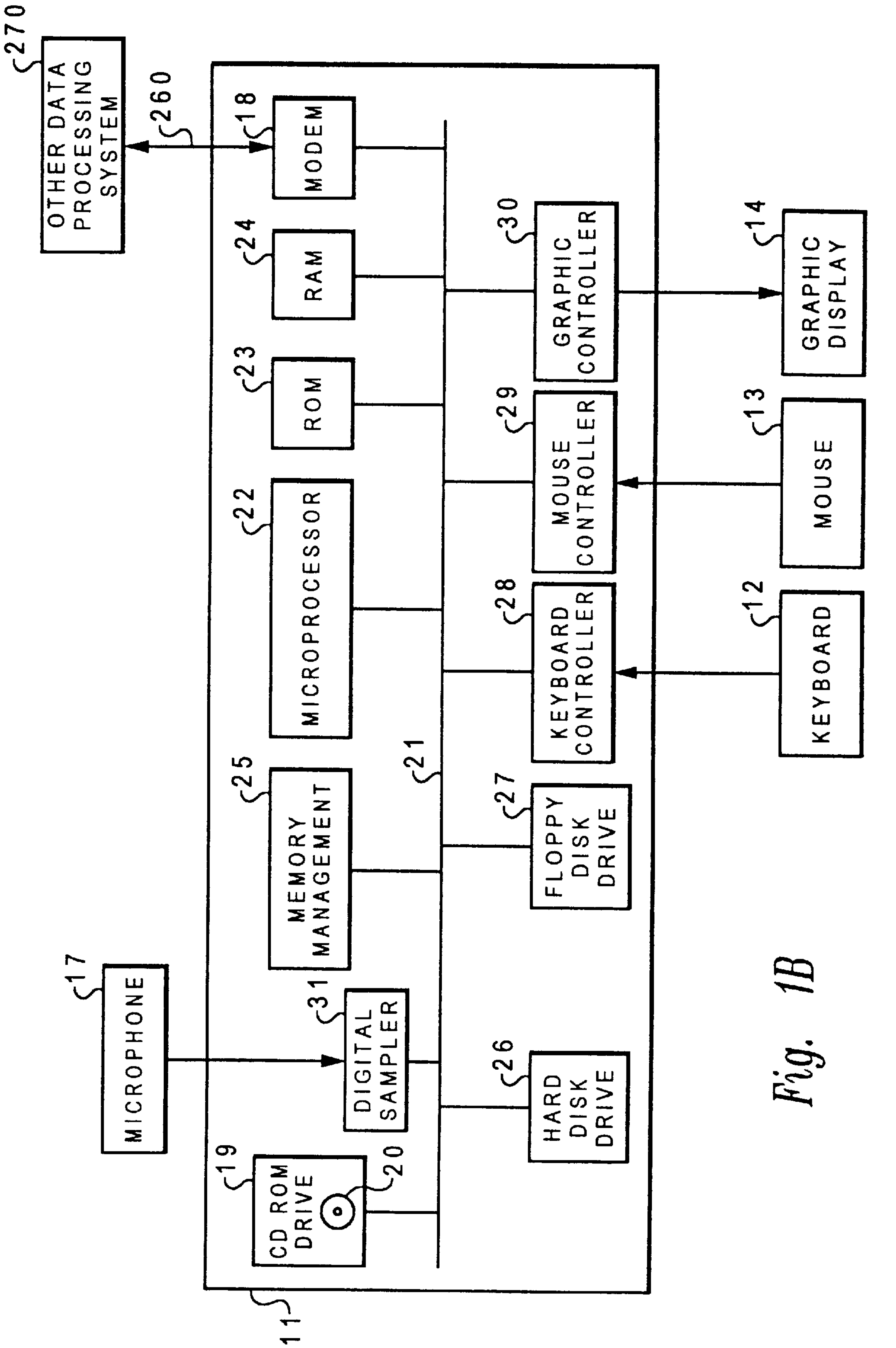
FIG. 1B is a block diagram of the components for the personal computer depicted in FIG. 1A.

Referring now to FIG. 1B, there is illustrated a block diagram of the components for personal computer 10 of FIG.

1A. unit 11 includes system bus 21 to which various components are attached and by which communications among various components is accomplished. Microprocessor 22, connecting to system bus 21, is supported by read only memory (ROM) 23 and random access memory (RAM) 24, both of which are also connected to system bus 21. Microprocessor 22 in the International Business Machines Corp.'s Aptiva™ series of computers is one of the Intel® 80×86 family of microprocessors; however, other microprocessors including the Motorola® family of microprocessors, such as 68000, 68020 or 68030, manufactured by Hewlett Packard, Inc.; Sun Microsystems; Intel, Inc.; Motorola, Inc.; and others may also be applicable.

ROM 23 contains, among other codes, the Basic Input/Output System (BIOS) which controls certain basic hardware operations, such as interactions of hard disk drive 26 and floppy disk drive 27. RAM 24 is the main memory within which the operating system and application programs having the present invention incorporated are loaded. A memory management device 25 is connected to system bus 21 for controlling all Direct Memory Access (DMA) operations such as paging data between RAM 24 and hard disk drive 26 or floppy disk drive 27.

As shown in FIG. 1B, a CD ROM drive 19 having a compact disk 20 inserted inside is installed within processor unit 11. However, several other peripherals, such as optical storage media, printers, etc., may also be added to personal computer 10. Further, a modem 17 may be utilized to communicate with other data processing systems 270 across communications line 260.

Processor unit 11 further comprises one digital sampler 31 and three input/output (I/O) controllers, namely, keyboard controller 28, mouse controller 29 and graphic controller 30, all of which are connected system bus 21. As its name implies, digital sampler 31 is for sampling and digitizing audio inputs received directly from microphone 17. As for the I/O controllers, keyboard controller 28 provides the hardware interface for keyboard 12, mouse controller 29 provides the hardware interface for mouse 13, and graphic controller 30 provides the hardware interface for graphic display 14. The hardware setup illustrated in FIGS. 1A and 1B is typical but may vary for a specific application.

Figure 2:
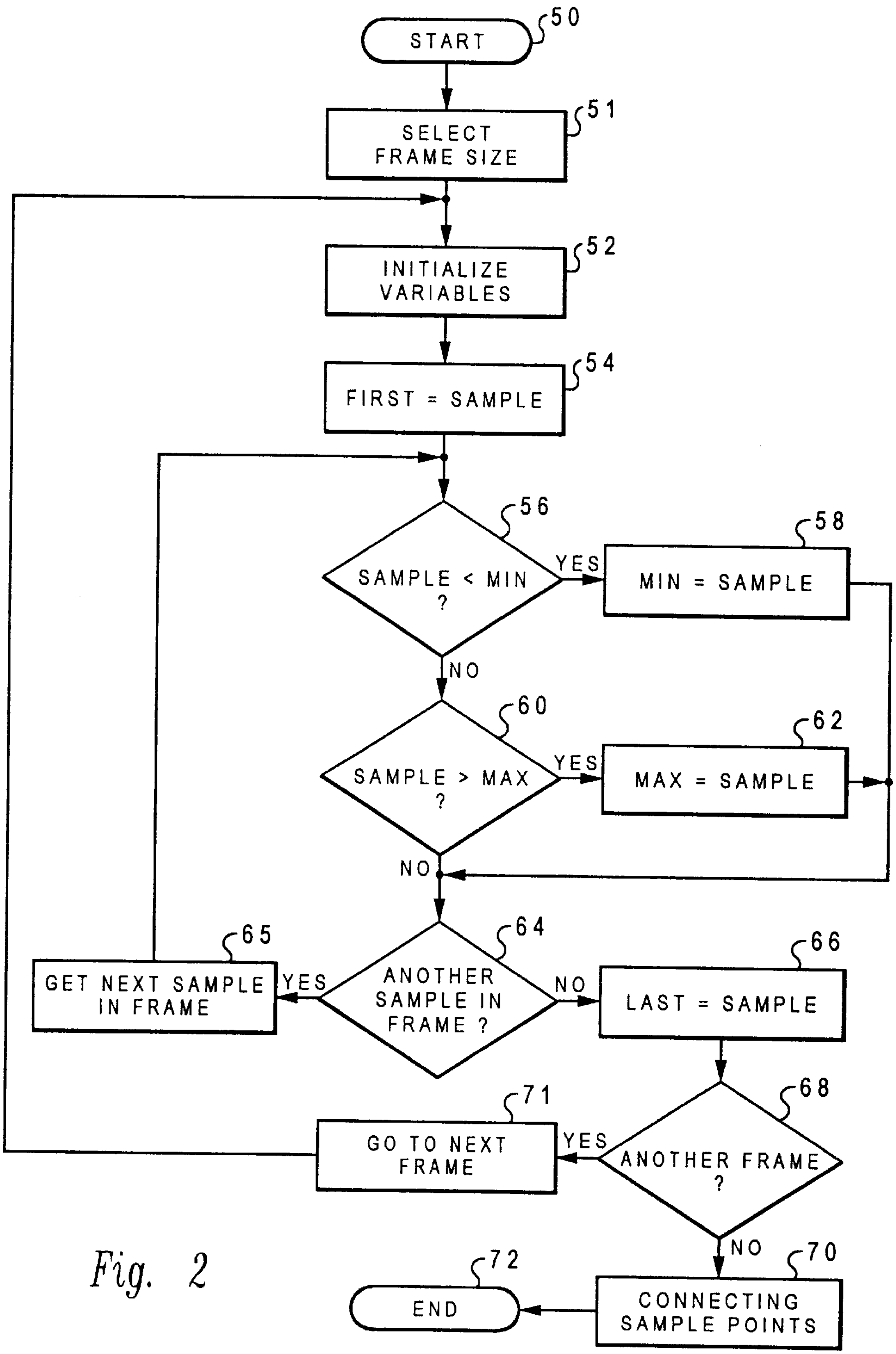
FIG. 2 is a high level logic flow diagram of the method for graphically displaying audio data according to a preferred embodiment of the invention.

Referring now to FIG. 2, there is illustrated a high level logic flow diagram of the method for graphically displaying audio data according to a preferred embodiment of the invention. Starting at block 50, a frame size for an audio data file is first selected at block 51. The frame size selection can be generated by the computer or accomplished via an input from a user. The audio data file will then be divided into a multiple number of frames accordingly. With the exception of the last frame, each frame should preferably contain a substantially equal number of audio data samples. As a preferred embodiment of the invention, the audio data file is a digital audio data file of 16 bit, mono, sampled at 11 KHz, under a pulse code modulation (PCM) format.

Then at block 52, variables FIRST, LAST, MIN and MAX are initialized to, preferrably, zero. At block 54, variable FIRST is set equal to the magnitude of a first sample within a frame. A determination is then made at block 56 as to whether the magnitude of the sample is less than the variable MIN. If the magnitude of the sample is less than the variable MIN, then the variable MIN is set to equal the magnitude of the sample at block 58, and the process proceeds to block 64. Otherwise, if the magnitude of the sample is not less than the variable MIN, then the process proceeds directly to block 60. a determination is made at block 60 as to whether the magnitude of the sample is greater than the variable MAX. If the magnitude of the sample is greater than the variable MAX, then the variable MAX is set to equal the magnitude of the sample at block 62, and the process proceeds to block 64. Otherwise, if the magnitude of the sample is not greater than the variable MAX, then the process proceeds directly to block 64.

Next, a determination is made at block 64 as to whether there is another sample in the frame. If there is still another sample in the frame, the next sample in the frame is obtained at block 65 and the process goes to block 56. Otherwise, if there is no sample left in the frame, the variable LAST is set to equal to the magnitude of the sample at block 66.

At block 68, a determination is made as to whether there is another frame in the audio data file. If there is still another frame left in the audio data file, the process goes to a next frame of the audio data file at block 71 and proceeds from block 52 again. Otherwise, if there is no frame left in the audio data file, a line connecting all the FIRST, MAX, MIN and LAST data points, in that order, for each frame is then displayed on the graphic display at block 70. Finally, the process exits at block 72.

Figure 3:
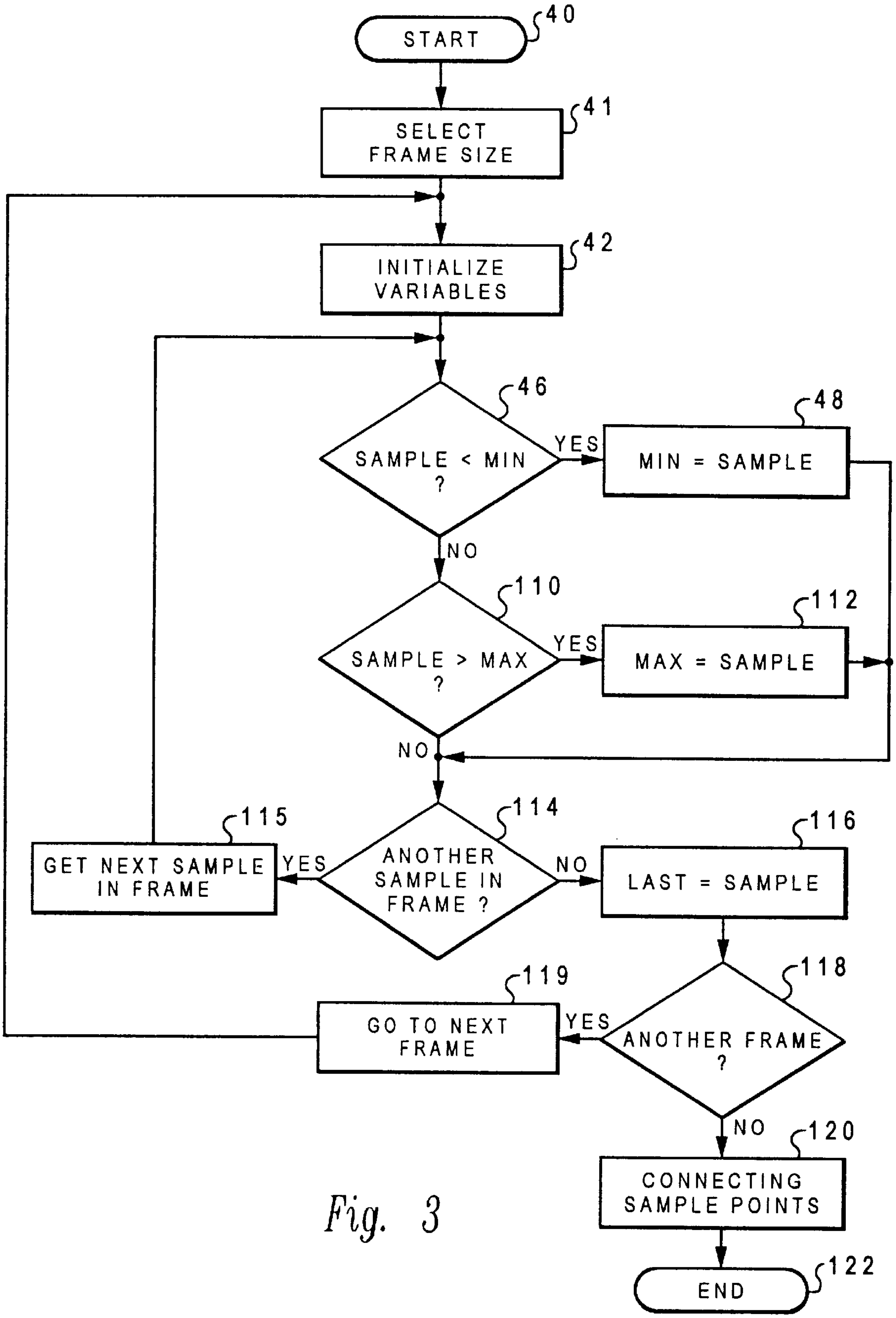
FIG. 3 is a high level logic flow diagram of the method for graphically displaying audio data according to an alternative embodiment of the invention.

Referring now to FIG. 3, there is illustrated a high level logic flow diagram of the method for graphically displaying audio data according to an alternative embodiment of the invention. Starting at block 40, a frame size for the audio data file is first selected at block 41. The frame size selection can be generated by the computer or accomplished via an input from a user. The audio data file will then be divided into a multiple number of frames accordingly. With the exception of the last frame, each frame should preferably contain a substantially equal number of audio data samples. Then, variables MAX, MIN and LAST are initialized at block 42. A determination is then made at block 46 as to whether the magnitude of the sample is less than the variable MIN. If the magnitude of the sample is less than the variable MIN, then the variable MIN is set to equal the magnitude of the sample at block 48, and the process proceeds to block 114. Otherwise, if the magnitude of the sample is not less than the variable MIN, then the process proceeds directly to block 110.

Subsequently, a determination is made at block 110 as to whether the magnitude of the sample is greater than the variable MAX. If the magnitude of the sample is greater than the variable MAX, then the variable MAX is set to equal the magnitude of the sample at block 112, and the process proceeds to block 114. Otherwise, if the magnitude of the sample is not greater than the variable MAX, then the process proceeds directly to block 114.

Next, a determination is made at block 114 as to whether there is another sample in the frame. If there is still another sample in the frame, the next sample in the frame is obtained at block 115 and the process goes to block 116. Otherwise, if there is no sample left in the frame, the variable LAST is set to equal to the magnitude of the sample at block 116.

At block 118, a determination is made as to whether there is another frame in the audio data file. If there is still another frame left in the audio data file, the process goes to a next frame of the audio data file at block 119 and proceeds from block 42 again. Otherwise, if there is no frame left in the audio data file, a line connecting all the MAX, MIN and LAST data points, in that order, for each frame is then displayed on the graphic display at block 120. Finally, the process exits at block 122.

Figure 4:
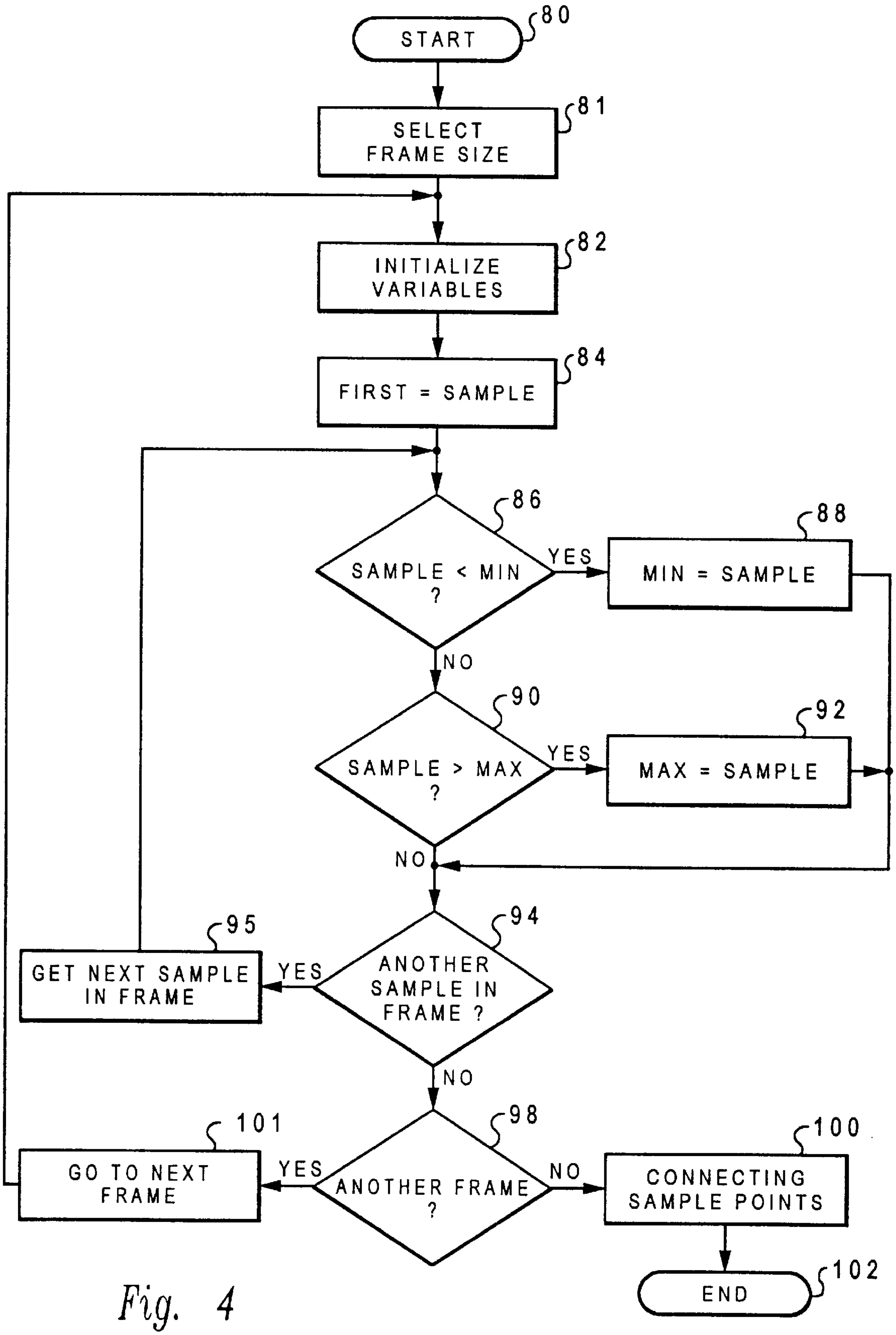
FIG. 4 is a high level logic flow diagram of the method for graphically displaying audio data according to yet another alternative embodiment of the invention.

Referring now to FIG. 4, there is illustrated a high level logic flow diagram of the method for graphically displaying audio data according to yet another alternative embodiment of the invention. Starting at block 80, a frame size for an audio data file is first selected at block 81. The frame size selection can be generated by the computer or accomplished via an input from a user. The audio data file will then be divided into a multiple number of frames accordingly. With the exception of the last frame, each frame should preferably contain a substantially equal number of audio data samples. Then, variables FIRST, MAX and MIN are initialized at block 82. At block 84, variable FIRST is set equal to the magnitude of a first sample within a frame. A determination is then made at block 86 as to whether the magnitude of the sample is less than the variable MIN. If the magnitude of the sample is less than the variable MIN, then the variable MIN is set to equal the magnitude of the sample at block 88, and the process proceeds to block 94. Otherwise, if the magnitude of the sample is not less than the variable MIN, then the process proceeds directly to block 90.

Subsequently, a determination is made at block 90 as to whether the magnitude of the sample is greater than the variable MAX. If the magnitude of the sample is greater than the variable MAX, then the variable MAX is set to equal the magnitude of the sample at block 92, and the process proceeds to block 94. Otherwise, if the magnitude of the sample is not greater than the variable MAX, then the process proceeds directly to block 94.

Next, a determination is made at block 94 as to whether there is another sample in the frame. If there is still another sample in the frame, the next sample in the frame is obtained at block 95 and the process goes to block 86. Otherwise, if there is no sample left in the frame, the process proceeds directly to block 98. block 98, a determination is made as to whether there is another frame in the audio data file. If there is still another frame left in the audio data file, the process goes to a next frame of the audio data file at block 101 and proceeds from block 82 again. Otherwise, if there is no frame left in the audio data file, a line connecting all the FIRST, MAX and MIN data points, in that order, for each frame is then displayed on the graphic display at block 100. Finally, the process exits at block 102.

Figure 5A:
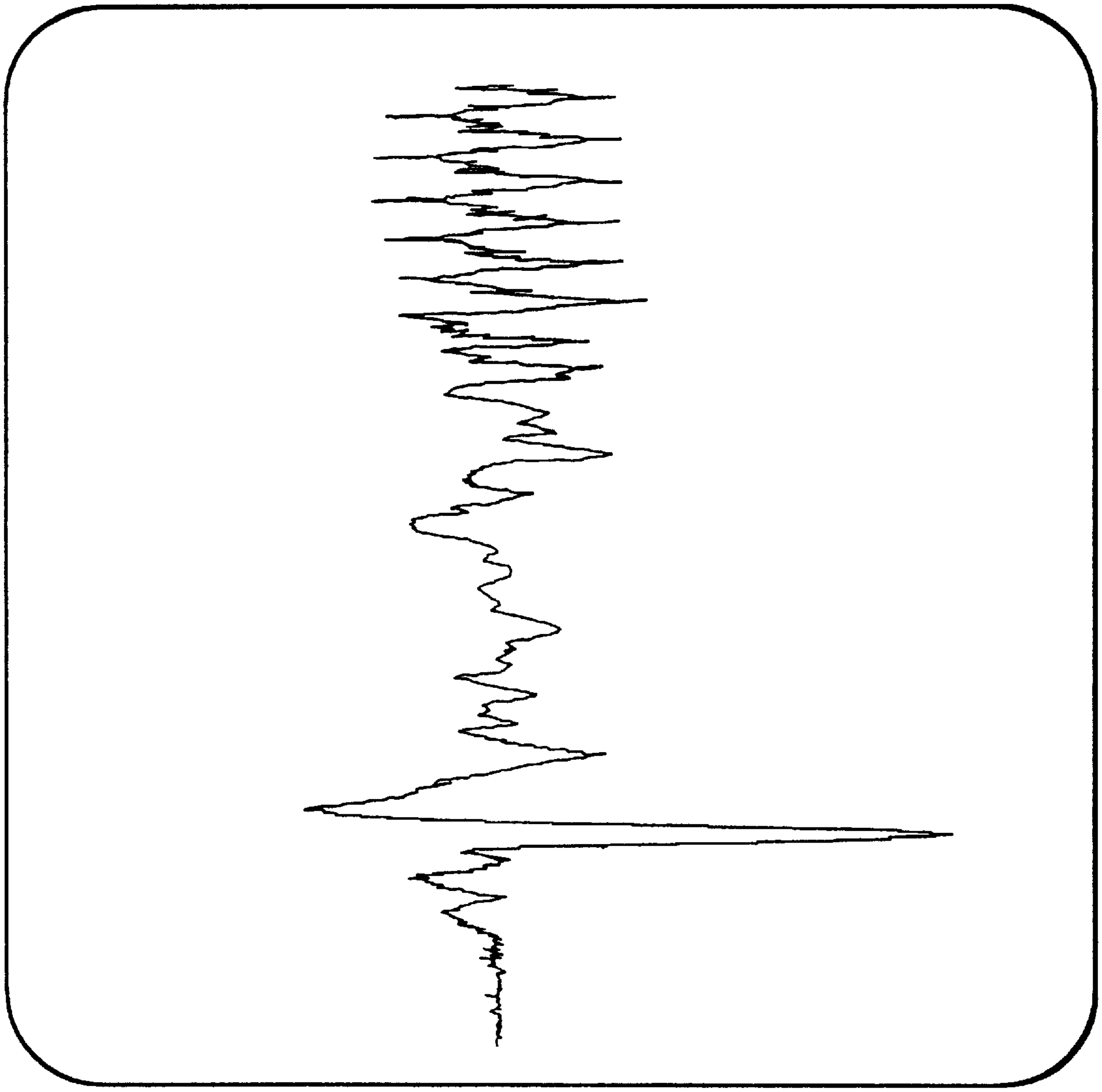
FIGS. 5A and 5B are plots of an audio data file using the high/low algorithm under prior art.
Figure 6A:
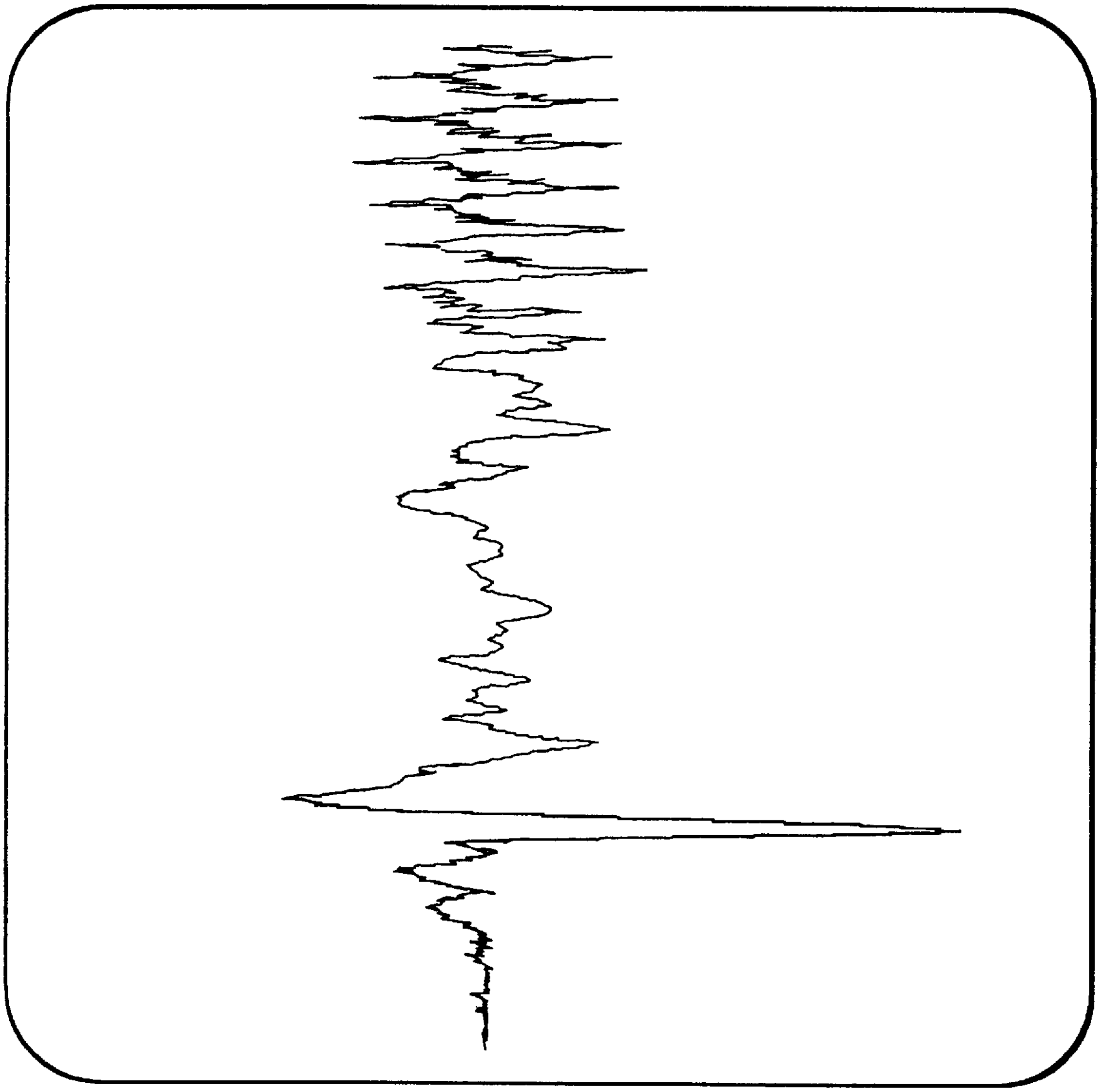
FIG. 6A and 6B are plots of the same audio data file using the algorithm under a preferred embodiment of the invention.

Referring now to FIGS. 5A and 6A, there are illustrated two screen images of the same segment of a digital audio data file under the same resolution. FIG. 5A is a waveform plot using the high and low value algorithm under prior art, and FIG. 6A is a waveform plot using the algorithm under a preferred embodiment of this invention. Upon causal inspection, both waveform plots seem to appear the same; however, there are subtle differences at certain locations. These differences arise from the fact that, under prior art, a line is arbitrarily drawn between the minimum of one frame to the maximum of the next frame to form line segments to approximate the waveform between two consecutive frames. These line segments, however, could yield a different waveform when compounded. The differences could also be attributed to the different y-coordinates at the transition points, where the line crosses between the two consecutive x-coordinates. Finally, differences could be attributed to the different end points for each line segment, causing the line segments to be artificially lengthened or shortened.

In contrast, the algorithm under this invention draws a line segment between the last point of one frame to the first point of the next frame; hence, a closer representation of the audio data could be achieved. Because a single continuous line is utilized to represent the continuous waveform, it is desirable to select the set of points that most closely represent the actual waveform and that minimize the overlapping of line segments.

In addition, the algorithm under this invention utilizes all significant data points in plotting the waveform and therefore minimizes the overlapping of the line segments and therefore represents the actual waveform most accurately.

Figure 5B:
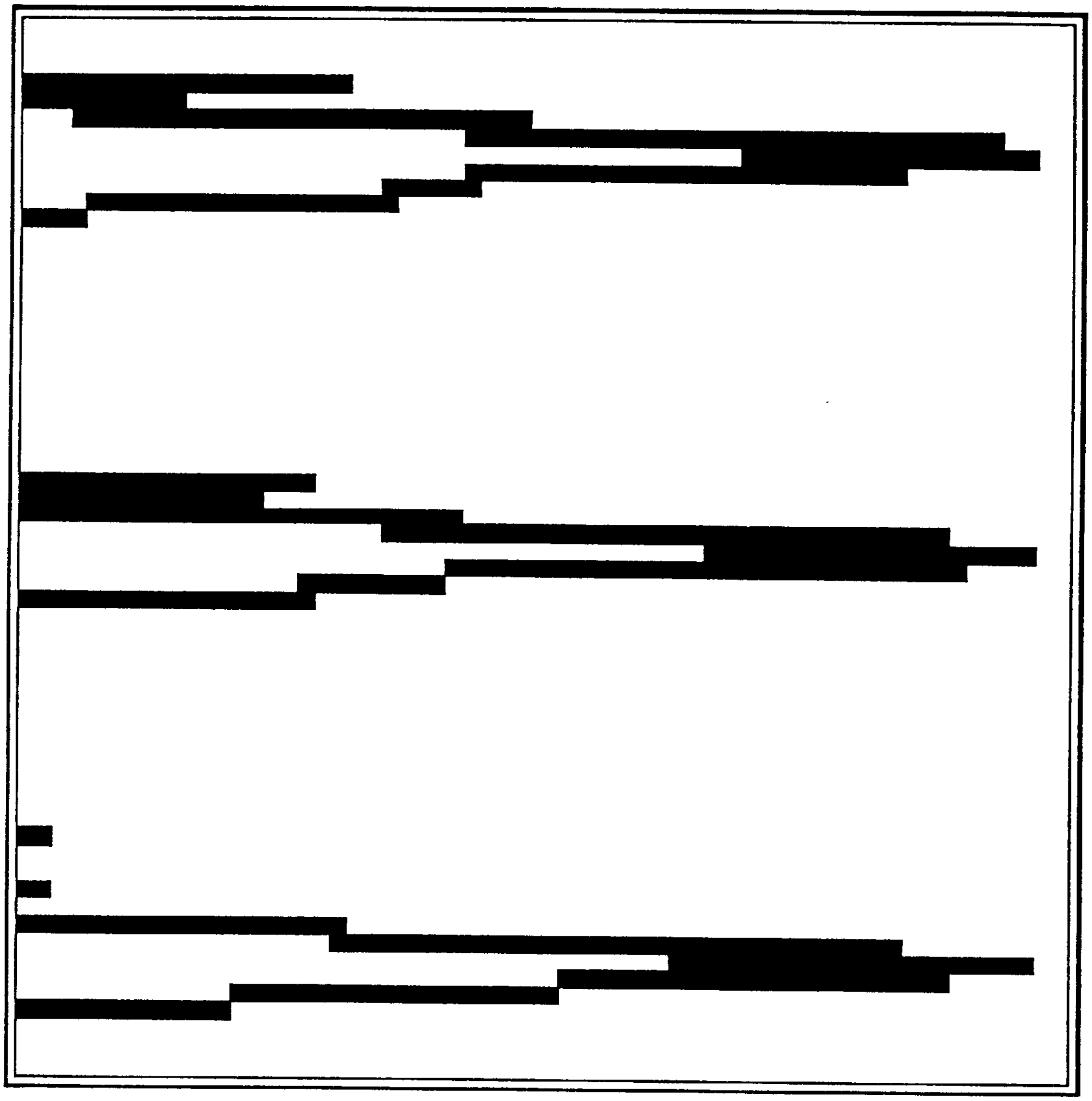
Figure 6B:
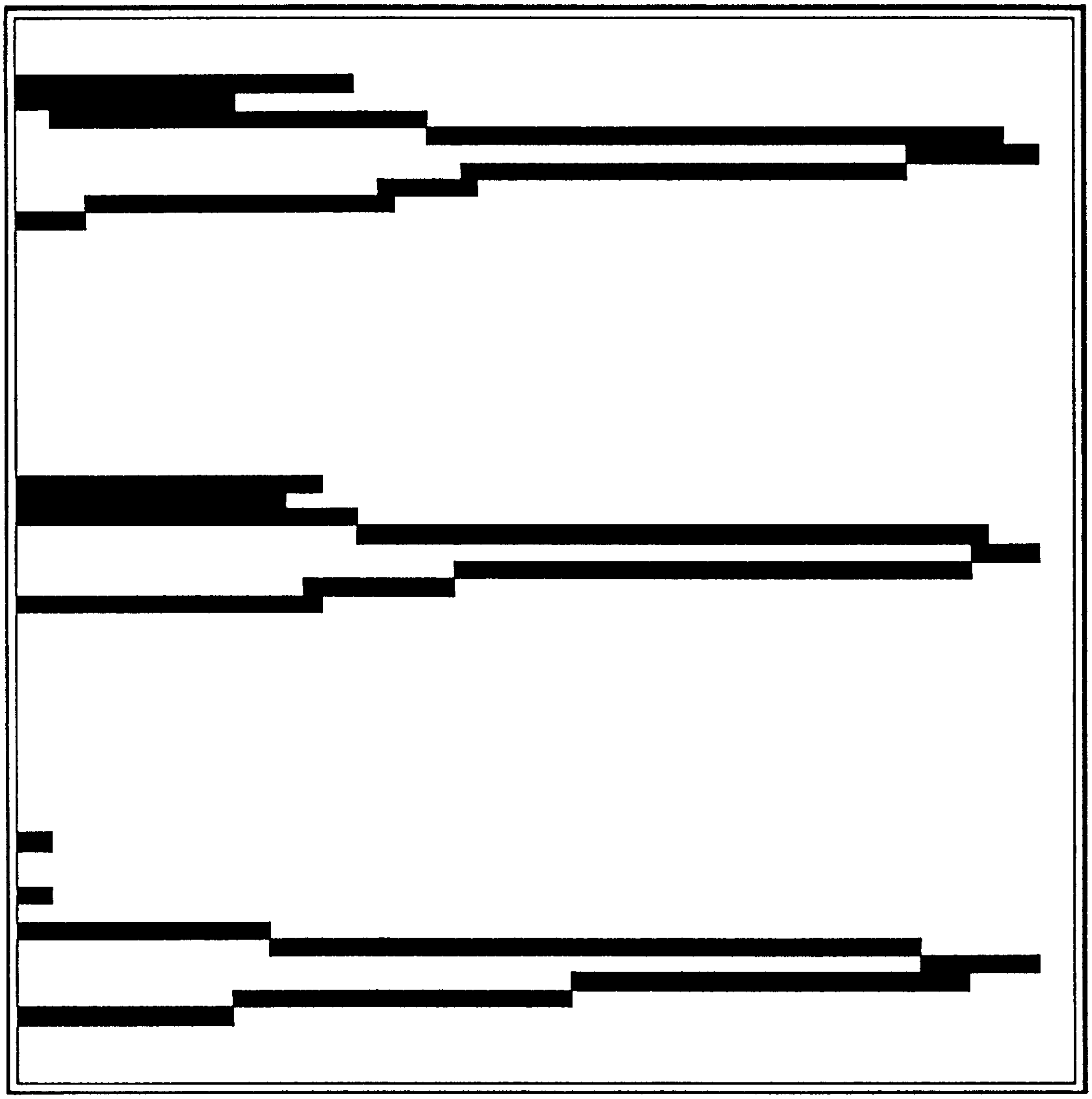

Referring now to FIGS. 5B and 6B, there is illustrated a magnifying view of the right side of the waveform where the spikes are located. The problem of non-consecutive line segments is shown in FIG. 5B but not in FIG. 6B.

As has been described, the present invention provides an improved method for graphically displaying audio data within a computer system. In addition to audio data files, this invention can also be applied to any file that is waveform in nature, such as microwaves, cardiograms, etc.

While the invention has been particularly shown and described with reference to a preferred embodiment, it will be understood by those skilled in the art that various changes in form and detail may be made therein without departing from the spirit and scope of the invention.

What is claimed is:

1. A method for graphically displaying audio data within a computer system, said method comprising:

dividing an audio data file into a plurality of frames, wherein each of said plurality of frames contains a substantially equal number of audio data;

selecting only three audio data values within each of said plurality of frames, wherein said only three audio data values include a first data value or a last data value;

determining whether a last frame within said audio data file has been reached;

in response to a determination that said last frame has not been reached, returning to said selecting step for another one of said plurality of frames; and in response to a determination that said last frame has been reached, displaying all said selected audio data values on a graphic display by connecting a line through all said selected audio data values such that a true trend in said audio data file can be represented.

2. The method for graphically displaying audio data within a computer system according to claim 1, wherein said only three audio data values include a first data value, a highest data value, and a lowest data value.

3. The method for graphically displaying audio data within a computer system according to claim 1, wherein said selecting step further includes a step of selecting one additional audio data value.

4. The method for graphically displaying audio data within a computer system according to claim 3, wherein said one additional audio data value is a last data value.

5. A computer system for graphically displaying audio data within a computer system, said computer system comprising:

means for dividing an audio data file into a plurality of frames, wherein each of said plurality of frames contains a substantially equal number of audio data;

means for selecting only three audio data values within each of said plurality of frames, wherein said only three audio data values include a first data value or a last data value;

means for determining whether a last frame within said audio data file has been reached;

means for returning to said means for selecting to handle another one of said plurality of frames, in response to a determination that said last frame has not been reached; and means for displaying all said selected audio data values on a graphic display by connecting a line through all said selected audio data values, in response to a determination that said last frame has been reached, wherein a true trend in said audio data file can be represented.

6. The computer system for graphically displaying audio data according to claim 5, wherein said only three audio data values include a first data value, a highest data value, and a lowest data value.

7. The computer system for graphically displaying audio data according to claim 5, wherein said means for selecting further includes a means for selecting one additional audio data value.

8. The computer system for graphically displaying audio data according to claim 7, wherein said one additional audio data value is a last data value.

9. A computer program product for graphically displaying audio data within a computer system, said computer program product comprising:

program code means for dividing an audio data file into a plurality of frames, wherein each of said plurality of frames contains a substantially equal number of audio data;

program code means for selecting only three audio data values within each of said plurality of frames, wherein said only three audio data values include a first data value or a last data value;

program code means for determining whether a last frame within said audio data file has been reached;

program code means for returning to said program code means for selecting to handle another one of said plurality of frames, in response to a determination that said last frame has not been reached; and program code means for displaying all said selected audio data values on a graphic display by connecting a line through all said selected audio data values, in response to a determination that said last frame has been reached, wherein a true trend in said audio data file can be represented.

10. The computer program product for graphically displaying audio data within a computer system according to claim 9, wherein said only three audio data values include a first data value, a highest data value, and a lowest data value.

11. The computer program product for graphically displaying audio data within a computer system according to claim 9, wherein said program code means for selecting further includes a program code means for selecting one additional audio data value.

12. The computer program product for graphically displaying audio data within a computer system according to claim 11, wherein said one additional audio data value is a last data value.

* * * * *

UNITED STATES PATENT AND TRADEMARK OFFICE

CERTIFICATE OF CORRECTION

PATENT NO. : 5,874,950
DATED : Feb. 23, 1999
INVENTOR(S) : Broussard et al

It is certified that error appears in the above-identified patent and that said Letters Patent is hereby corrected as shown below:

Column 5, line 32, after the first occurance of "block 98" please insert a new paragraph, which will begin with --At--;

Signed and Sealed this

Thirteenth Day of July, 1999

*Attest:*

Q. TODD DICKINSON

*Attesting Officer*

*Acting Commissioner of Patents and Trademarks*